(12) United States Patent
Bhatia (10) Patent No.: US 6,434,001 B1
(45) Date of Patent: Aug. 13, 2002

(54) HEAT EXCHANGER FOR A PORTABLE COMPUTING DEVICE AND DOCKING STATION

(75) Inventor: Rakesh Bhatia, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/504,204

(22) Filed: Feb. 15, 2000

Related U.S. Application Data

(62) Division of application No. 08/844,801, filed on Apr. 22, 1997.

(51) Int. Cl.$^7$ ............................. G06F 1/20; H05K 7/20
(52) U.S. Cl. .................. 361/687; 361/700; 165/104.14
(58) Field of Search ................................ 361/687, 699, 361/700; 165/104.33, 104.14, 185; 62/259.2; 174/15.2

(56) References Cited

U.S. PATENT DOCUMENTS

| | | | |
|---|---|---|---|
| 4,449,576 A | 5/1984 | Baum et al. | |
| 5,159,972 A | 11/1992 | Gunnerson et al. | |
| 5,195,576 A | 3/1993 | Hatada et al. | |
| 5,198,889 A | 3/1993 | Hisano et al. | |
| 5,255,109 A | 10/1993 | Klein | |
| 5,313,362 A | 5/1994 | Hatada et al. | |
| 5,361,188 A | 11/1994 | Kondou et al. | |
| 5,398,748 A | * 3/1995 | Yamaji et al. | 165/104.21 |
| 5,402,312 A | 3/1995 | Kinjo et al. | |
| 5,409,055 A | 4/1995 | Tanaka et al. | |
| 5,414,591 A | 5/1995 | Kimura et al. | |
| 5,424,913 A | 6/1995 | Swindler | |
| 5,427,502 A | 6/1995 | Hudson | |
| 5,430,609 A | 7/1995 | Kikinis | |
| 5,441,576 A | 8/1995 | Bierschenk et al. | |
| 5,458,189 A | 10/1995 | Larson et al. | |
| 5,475,563 A | 12/1995 | Donahoe et al. | |
| 5,513,070 A | 4/1996 | Xie et al. | |
| 5,522,712 A | 6/1996 | Winn | |
| 5,550,710 A | 8/1996 | Rahamin et al. | |
| 5,559,673 A | 9/1996 | Gagnon et al. | |
| 5,559,675 A | 9/1996 | Hsieh et al. | |
| 5,583,316 A | 12/1996 | Kitahara et al. | |
| 5,588,483 A | 12/1996 | Ishida | |
| 5,598,320 A | 1/1997 | Toedtman et al. | |
| 5,621,613 A | 4/1997 | Haley et al. | |
| 5,646,822 A | 7/1997 | Bhatia et al. | |
| 5,656,824 A | 8/1997 | Ohashi et al. | |
| 5,694,292 A | 12/1997 | Paulsel et al. | |
| 5,704,212 A | 1/1998 | Erler et al. | |
| 5,768,101 A | 6/1998 | Cheng | |
| 5,831,823 A | 11/1998 | Hoedl | |
| 5,884,049 A | 3/1999 | Atkinson | |

FOREIGN PATENT DOCUMENTS

EP 0702287 3/1996

OTHER PUBLICATIONS

IBM Technical Disclosure Bulletin, vol. 22, No. 8A, Jan. 1980, 1 pg.

* cited by examiner

Primary Examiner—Lynn D. Feild
(74) Attorney, Agent, or Firm—Jeffrey S. Draeger (57) ABSTRACT

A heat exchanger for a computing device and a docking station. The heat exchanger includes a first heat transfer element and a second heat transfer element. The first heat transfer element has a portion thermally coupled to an electronic component. The first and the second heat transfer element conformally engage each other yet are removable from each other.

21 Claims, 8 Drawing Sheets

HEAT EXCHANGER FOR A PORTABLE COMPUTING DEVICE AND DOCKING STATION

This application is a division of U.S. application Ser. No. 08/844,801 filed Apr. 22, 1997.

FIELD OF THE INVENTION

The present invention pertains to the field of the heat removal from electronic components. More particularly, this invention relates to heat removal from a portable computing device.

BACKGROUND

Faster and more powerful computer components allow the design and construction of higher performance portable computing devices such as laptop or notebook computers. Unfortunately, the use of such faster and more powerful computer components often results in increased heat generation by such computing devices. Thus, improved heat dissipation technology is often needed to maintain operating temperatures of portable computing devices within the same range as their predecessors or some other acceptable range.

A portable computing device typically includes a base and a screen which are rotatably attached by a hinge. The base usually has an input device such as a keyboard or a touchpad as well as a number of electronic components. Integrated circuits with the highest clock frequency are typically located in close proximity to each other within the computer base.

Many heat generating computer system components take the form of integrated circuits. Such integrated circuits are typically mounted on a motherboard or another circuit board within the base the portable computer system. A processor is one component that generates a large amount of heat in a typical processor system. Other electrical components which also generate heat include memory circuits, power supply circuits, and circuit boards such as video card.

Maintaining operating temperatures of computer system components below certain levels is important to ensure performance, reliability, and safety. Most integrated circuits have specified maximum operating temperatures, above which the manufacturer does not recommend operation. Transistors, the building blocks of integrated circuits, tend to slow down as operating temperature increases. Thus, a computer system that operates its integrated circuits close to or beyond recommended timings may fail as temperature increases.

Additionally, integrated circuits may be physically damaged if temperatures elevate beyond those recommended. Such physical damage obviously can impact system reliability. Finally, the computer system casing should be kept at a temperature which is safe for human contact. This may necessitate spreading of heat throughout a computer system base or efficiently expelling heat to avoid hot spots near certain components such as a processor.

Typically, heat sinks, fans, and heat pipes are employed to dissipate heat from integrated circuits and other electronic components. Increases in heat generation are often accommodated by simply increasing the quantity or size of these heat dissipation elements. The relatively small size of a portable computing device, however, complicates heat dissipation by limiting airflow, crowding heat generating components, and reducing the space available for heat dissipation devices.

Since the computer base size is generally kept to a minimum, and the computer base contains both the input device and numerous other electronic components, there may be inadequate space to dissipate enough heat to keep the electronic components within their acceptable range of operating temperatures. Additionally, heat dissipation through the bottom of the base is limited because the computer is usually operated on a relatively flat low conductance surface.

One prior art method for removing heat from the base of a portable computing device involves transferring heat from the base of the device to the display. The technique of transferring heat to the display is limited due to the thermal and mechanical difficulties involved with transferring heat through the hinge of the computing device. Additionally, using this technique, all of the heat is dissipated by the portable computing device.

A docking station is a well known computer attachment that mates with a portable computer to allow the portable computer access to various peripheral devices. Typically, the base of the portable computer plugs into a larger monitor and a full size keyboard. This advantageously allows a portable computer user operate a portable computing device in a more ergonomic desktop computer setting rather than using a small keyboard and screen as is typically provided in a portable computing device.

The portable computer is often guided into the docking station by alignment rails, and docking pins from the docking station engage a mating connector at the rear of the portable computer. Electrical receptacles from either the docking station or the portable computer engage mating connectors from the other device.

Mating a portable computing device with a docking station often compounds the difficulty of cooling portable computing devices because the display is typically closed. This reduces the natural or passive cooling capability of the portable computing device because convective airflow over the top of the base is mostly blocked by the screen The prior art does not take advantage of the various components such as a docking station with which a portable computing device may be mated. Particularly, the prior art does not provide a solution which transfers heat from a portable computing device to a docking station for dissipation.

SUMMARY

A heat exchanger for a portable computing device and a docking station is described. The heat exchanger includes a first heat transfer element and a second heat transfer element. The first heat transfer element has a portion for thermally coupling to an electronic component. The first and the second heat transfer element conformally engage each other yet are removable from each other.

BRIEF DESCRIPTION OF THE FIGURES

The present invention is illustrated by way of example and not limitation in the figures of the accompanying drawings.

DETAILED DESCRIPTION

The present invention provides a heat exchanger for a portable computing device and docking station. In the following description, numerous specific details, such as component types, heat dissipation device sizes, and heat dissipation component mounting structures, and locations are set forth in order to provide a more thorough understanding of the present invention. It will be appreciated, however, by one skilled in the art that the invention may be practiced without such specific details.

The present invention provides numerous solutions to remove heat from a portable computing device through a mated docking station. With the ability to remove additional heat through the docking station, it may become possible to operate components such as a processor in a portable computing device at a higher power level by either increasing the supplied voltage, reducing clock throttling, or increasing the operating frequency of the processor. As a result, a portable computing device may be able to obtain higher performance while docked at a docking station.

Figure 1:
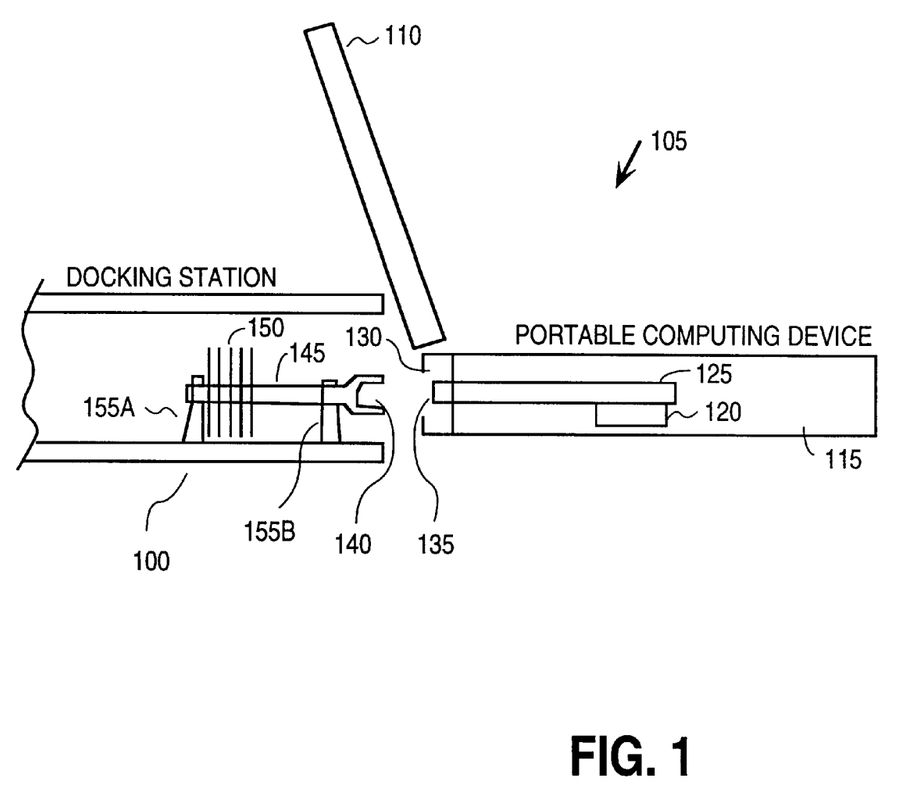
FIG. 1 illustrates a side cross section elevation view of one embodiment of a portable computing device and a docking station configured according to the present invention.

FIG. 1 illustrates one embodiment of the present invention. A portable computing device 105 may be a laptop computer, a notebook computer, or any other portable computing device which may desire additional cooling capacity when docked at a docking station 100. The portable computing device 105 includes at least an electronic component 120 and a heat transfer element 125 to convey heat away from the electronic component. Additionally, the portable computing device includes a base 115 and a display 110 hingedly mounted at one edge of the base 115.

In one embodiment, the electronic component 120 is a processor; however, other components or regions of the portable computing device may be cooled according to the present invention. In a typical laptop or notebook computer, many other components are present. A memory system, a disk and/or CD ROM drive, audio and video hardware, connectivity (i.e., network and modem) hardware, as well as a power supply may all be present. These or other individual components as well as circuit boards or regional heat sinks within the portable computing device 105 may be cooled according to the present invention.

Figure 2A:
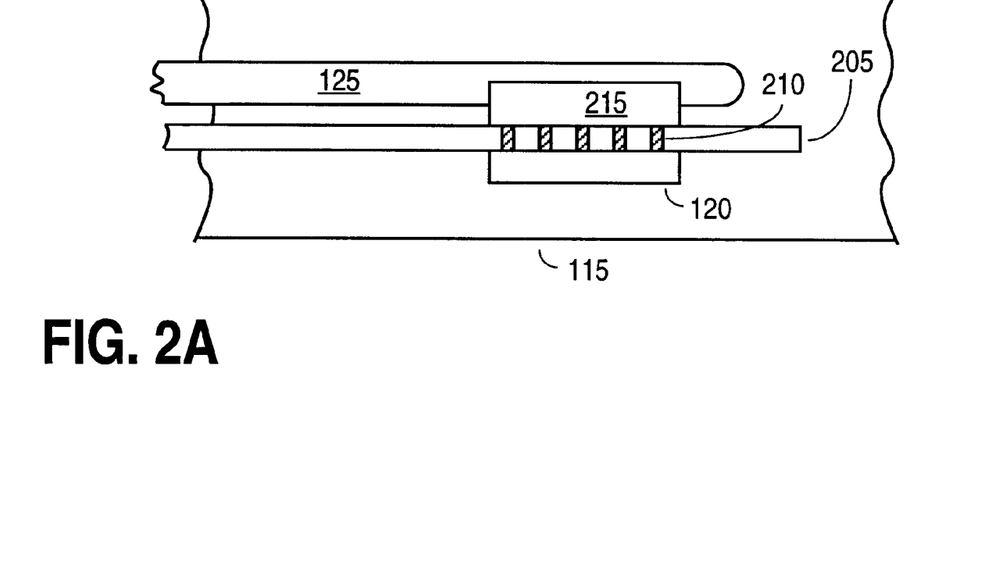
FIG. 2a illustrates a partial cross section elevation view of the connection of a heat transfer element to an electronic component according to one embodiment of the present invention.

A first portion near one end of the heat transfer element 125 is thermally coupled to the electronic component 120. FIG. 2a illustrates the thermal coupling of the electronic component 120 to the heat transfer element 125. The electronic component 120 is mounted on one side of a motherboard 205 and may be thermally coupled to the heat transfer element 125 via several heat conducting components. In the embodiment of FIG. 2a, the heat conducting components include motherboard vias 210 and a heat conducting block 215. In one embodiment, the block 215 is an aluminum block and the vias 210 are filled with solder. The heat transfer element 125 is affixed to the heat conducting block 215 using solder, thermal epoxy, or other suitable means as are known in the art. This type of mounting may be preferable if the electronic component does not have a rigid package which can withstand a direct connection with the heat transfer element 125.

Figure 2B:
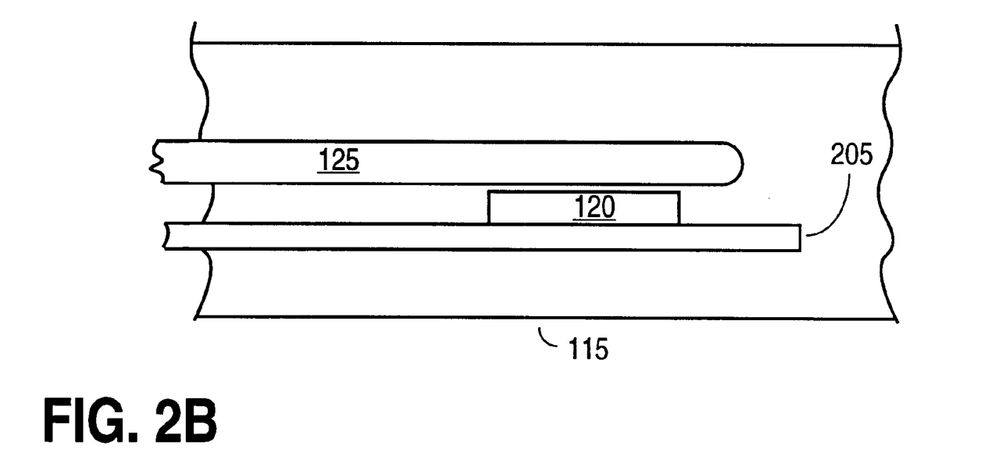
FIG. 2b illustrates a partial cross section elevation view of the connection of a heat transfer element to an electronic component according to another embodiment of the present invention.

FIG. 2b illustrates another embodiment in which the heat transfer element 125 is directly mounted on an outer surface of the electronic component 120 using a thermal epoxy, solder, or similar means. The inner surface of the component is affixed to the motherboard 205. Either of these types of connections may be used as well as any other means of thermally coupling the electronic component 120 and the heat transfer element 125.

An end portion 135 of the heat transfer element 125 may be exposed through a closeable aperture at a mating end of the portable computing device 105 when the portable computing device 105 is docked. Mechanisms well known in the art may be used to cause a door 130 to open the closeable aperture, either automatically or manually.

The docking station 100 includes a second heat transfer element 145. The second heat transfer element 145 is secured to the docking station 100 by a pair of mounting brackets 155a and 155b. Other known mounting mechanisms may be used as is convenient for a particular docking station configuration. For instance, only a single mounting bracket may be used, or more than two mounting brackets may be used. A set of heat dissipation fins 150 as well as the heat transfer element form a heat dissipation mechanism which dissipates heat in the docking station.

A heat exchange mechanism is formed by the heat transfer elements 125 and 145. One end of the heat transfer element 145 conformally engages the end portion 135 of the heat transfer element 125 when the docking station 100 and the portable computing device 105 mate. As illustrated, in one embodiment, the heat exchange mechanism is formed by a female end of the heat transfer element 145 engaging a male connector end of the heat transfer element 125. Alternately, these mechanisms may be reversed; however, the smaller male end is more appropriate for the portable computing device 105.

In one embodiment, both the heat transfer elements 125 and 145 are cylindrical or at least substantially cylindrical heat pipes. Such heat pipes have high thermal conductivity and may be smaller than one-quarter inch in diameter and still be able to dissipate sufficient power for some systems. In this embodiment, the female end forms a larger hollow cylinder substantially surrounding a portion of the male end.

In other embodiments, the female end may form a square engaging receptor for the male end. Additionally, one or both of the heat pipes may be rectangular or another shape, and the female end may fully encircle the male end or may have two or more separate engaging portions which partially surround the male end. Furthermore, the heat transfer elements may be other efficient heat conductors such solid metals, conductive fibers or other similar materials known in the art.

Figure 3:
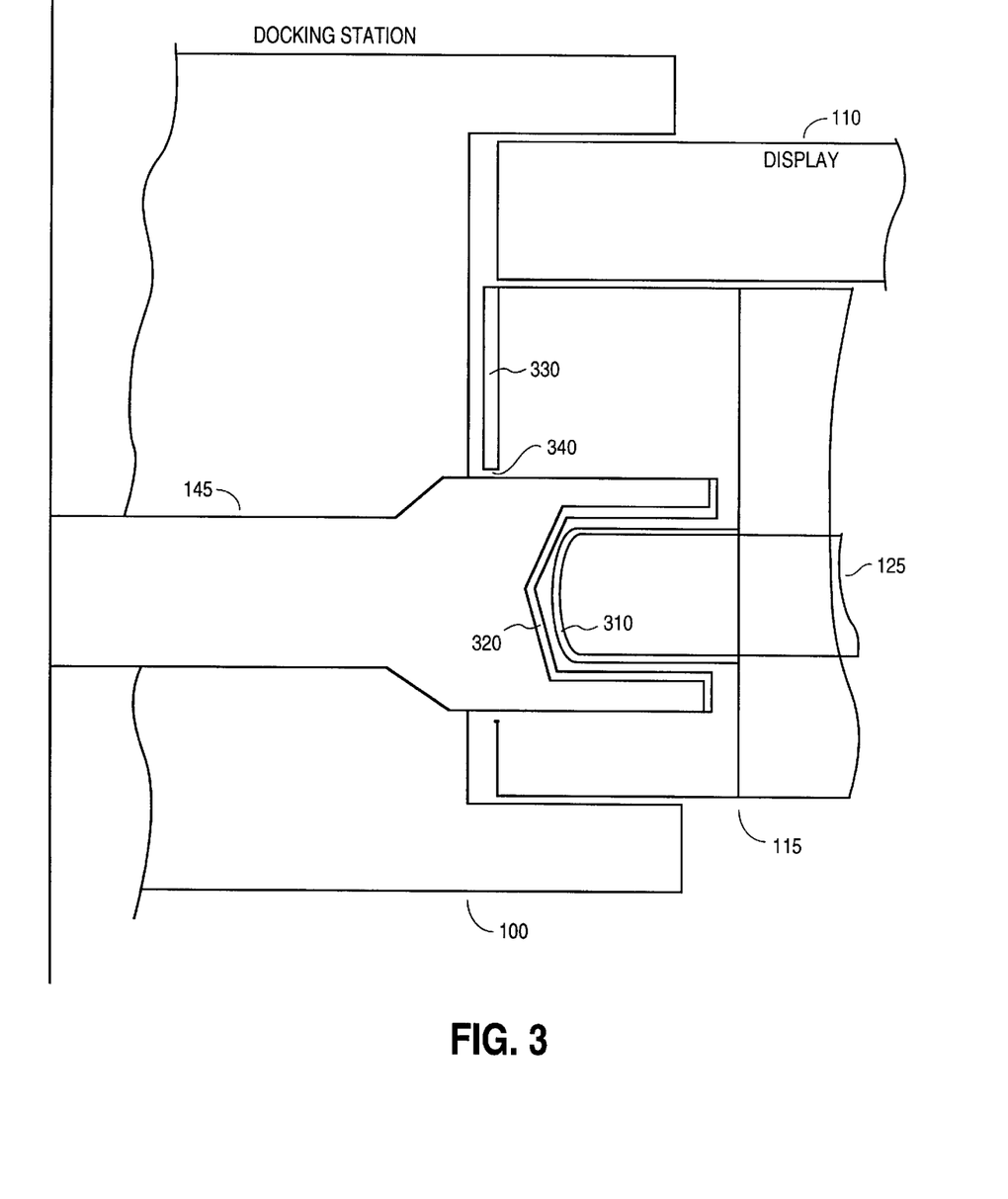
FIG. 3 illustrates a partial cross section elevation view of a male/female heat exchanger according to one embodiment of the present invention.

FIG. 3 shows an enlarged view of an embodiment of the heat exchange mechanism of FIG. 1. In this embodiment, the male end of the heat transfer element 125 is coated with a hardened coating 310. Additionally, the female end of the heat transfer element 145 is coated with a hardened coating 320. These coatings help prevent wear on the heat conductors yet do not significantly impede heat transfer. Any known solid state coating such as molybdenum may be used. Alternately, a thermal grease may be used; however, such a grease may be inadvertently spread to inappropriate areas if the portable computing device and the docking station are not carefully mated.

One alternative to the male/female heat exchange mechanism illustrated in FIG. 1 and FIG. 3 is a "jaws" heat exchange mechanism as shown in FIG. 4. The jaws heat exchanger utilizes two engaging surfaces 415a and 415b to thermally couple heat transfer elements 400a and 400b to the heat transfer element 125. The engaging surfaces are typically thermally conductive (e.g., a metal such as copper) fittings shaped to conformally engage the heat transfer element 125. As the portable computing device 105 is mated with the docking station 115, the two springs 410a and 410b respectively urge the engaging surfaces 415a and 415b into contact with the heat transfer element 125.

Figure 4A:
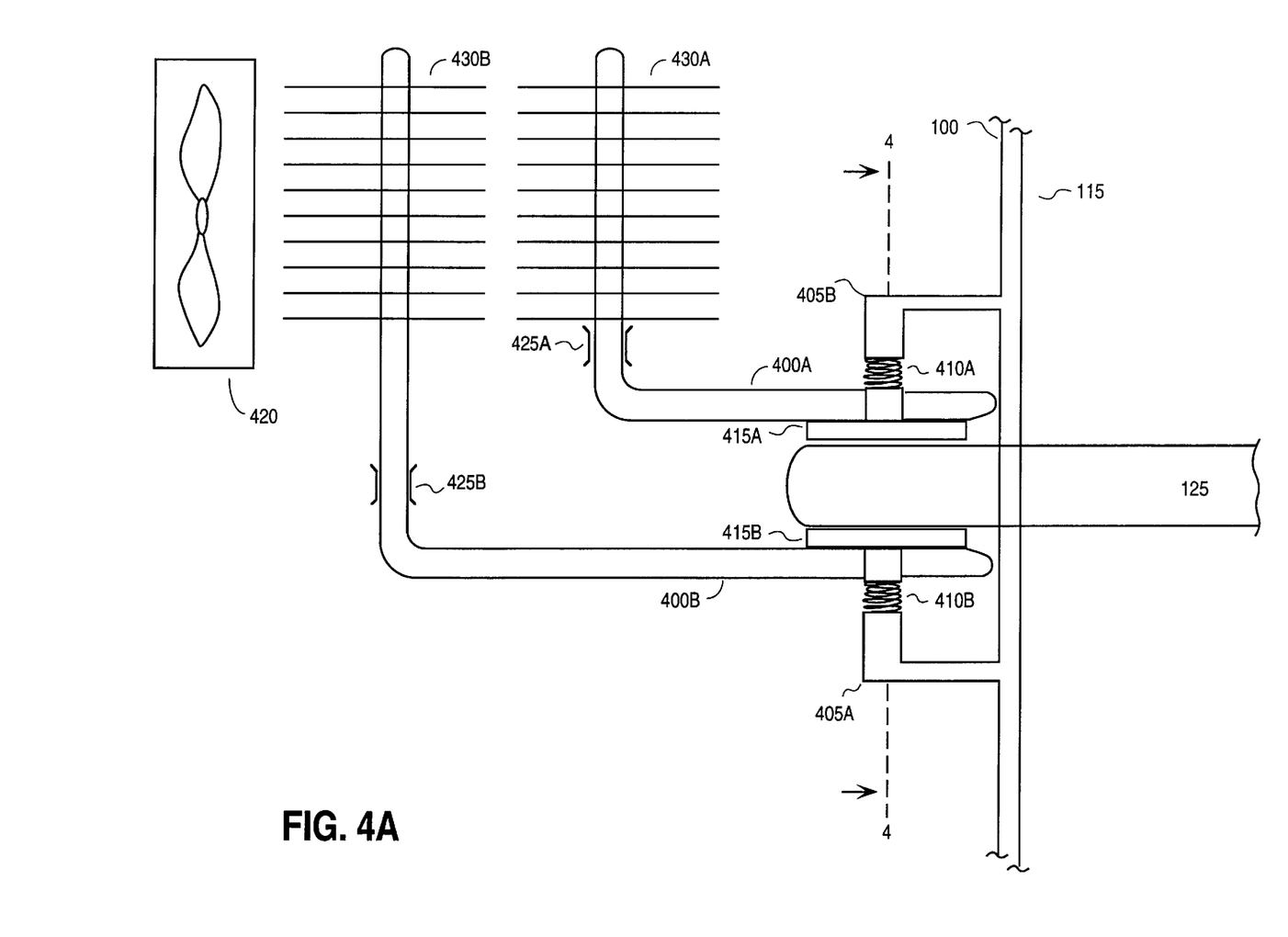
FIG. 4a illustrates a jaws heat exchanger according to one embodiment of the present invention.

The springs 410a and 410b are mounted by mounting elements 405a and 405b to the housing of the docking station 100. The heat transfer elements 400a and 400b are slideably secured by guides 425a and 425b. Typically, the engaging surfaces 415a and 415b form a narrower opening than the heat transfer element 125 such that the engaging surfaces 415a and 415b move laterally in response to the insertion force of the heat transfer element 125 upon mating of the docking station 100 and the portable computing device 105.

The heat transfer elements 400a and 400b also include heat dissipation fins 430a and 430b. A fan 420 may also be affixed to the housing of the docking station 100 in order to further improve heat dissipation. In one embodiment where the electronic component generates ten to fifteen watts, the heat dissipation apparatus is fairly compact. The fan is approximately two inches, and the engaging surfaces 415a and 415b are approximately one-half inch. In one embodiment, each of the heat transfer elements 125, 400a, and 400b is a cylindrical heat pipe with a diameter of one-quarter inch or less. As is true with most embodiments, larger heat transfer elements (e.g., heat pipes) may be used to dissipate larger amounts of power if necessary.

Figure 4B:
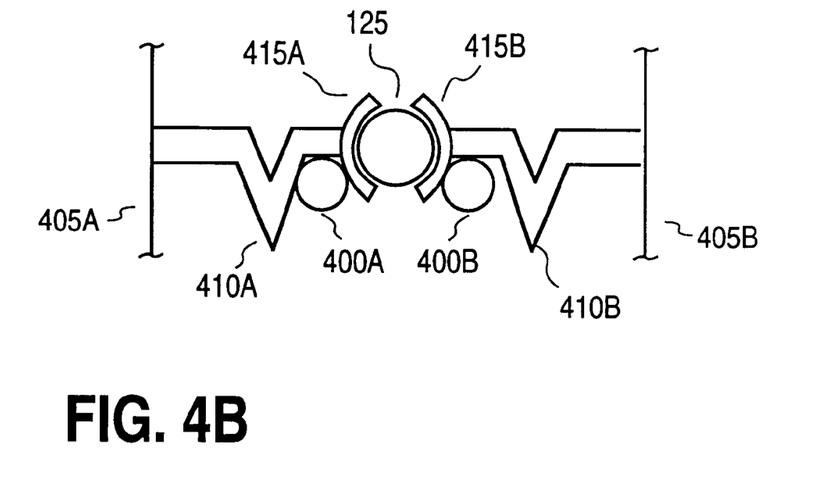
FIG. 4b illustrates a partial cross section elevation view of the jaws heat exchanger of FIG. 4a taken along section lines 4—4.

FIG. 4b illustrates a partial cross section elevation view of the jaws heat exchanger shown in FIG. 4a taken along section lines 4—4 for one embodiment. This embodiment utilizes leaf spring mechanisms 410a and 410b to urge the engaging surfaces 415a and 415b against the heat transfer element 125. The heat transfer elements 400a and 400b are typically soldered to the engaging surfaces 415a and 415b, though other thermally conductive connections such as thermal epoxy may be used.

Figure 4C:
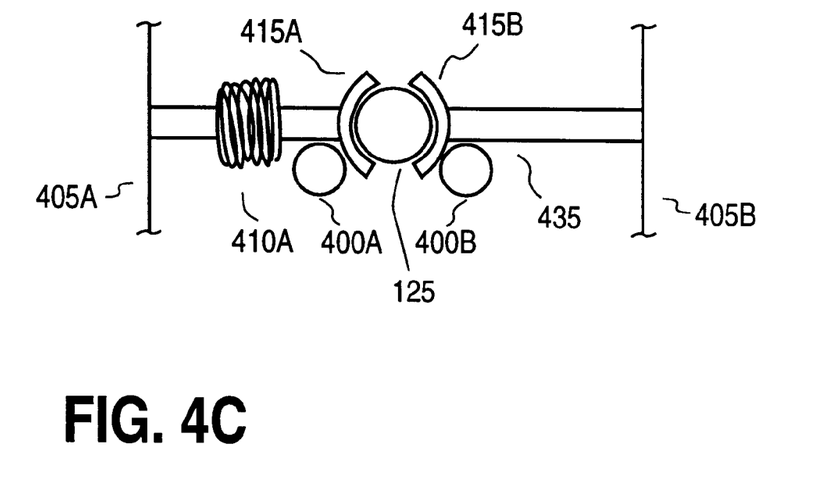
FIG. 4c illustrates a partial cross section elevation view of a jaws heat exchanger according to another embodiment of the present invention.

FIG. 4c illustrates an alternate embodiment of a jaws heat exchanger which uses a single helical spring 410a attached to the engaging surface 415a to engage the heat transfer element 125. In this embodiment, a rigid mounting 435 affixes the other engaging surface 415b to the mounting element 405b which in turn is connected to the housing of the docking station 100. Thus, only the heat transfer element 400a moves when the heat transfer element 125 is inserted into the heat exchange jaws. While this embodiment reduces moving parts and eliminates the need to slideably mount the other heat transfer element 400b, ease of docking may be reduced.

Figure 4D:
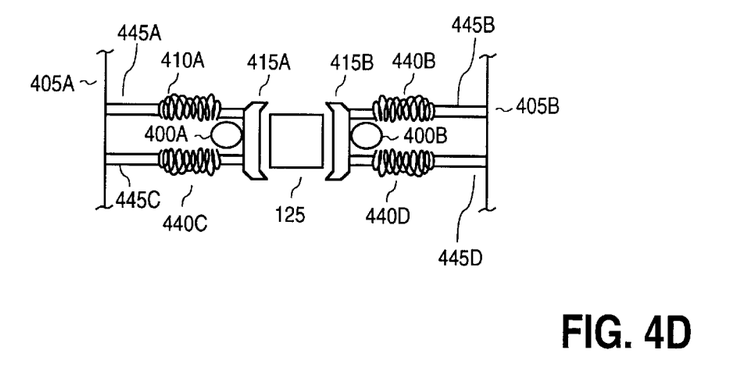
FIG. 4d illustrates a partial cross section elevation view of a jaws heat exchanger according to another embodiment of the present invention.

FIG. 4d illustrates a partial cross section elevation view of another embodiment of the jaws heat exchanger which uses multiple helical springs 440a, 440b, 440c, and 440d as well as a rectangular heat transfer element 125. The helical springs are secured to the mounting elements 405a and 405b by additional mountings 445a, 445b, 445c, and 445d. In this embodiment, the engaging surfaces 415a and 415b include straight portions to conformally engage the heat transfer element 125. The heat transfer elements 400a and 400b are mounted between the helical springs in a more central position on the engaging surfaces 415a and 415b. This embodiment also provides better stability for the engaging surfaces 415a and 415b.

Figure 4E:
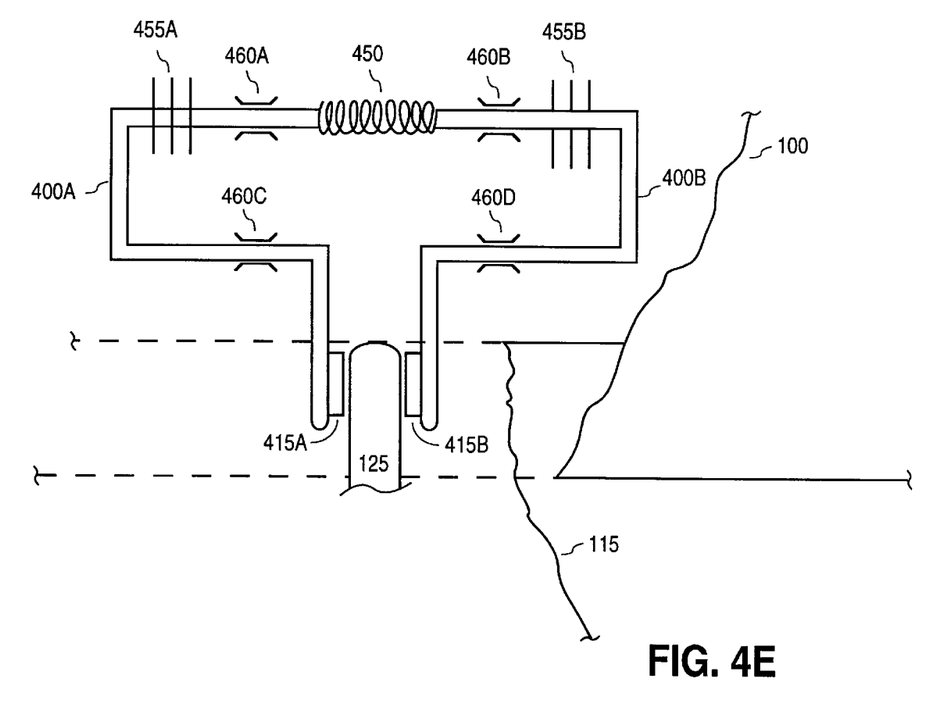
FIG. 4e illustrates a jaws heat exchanger according to another embodiment of the present invention.

FIG. 4e illustrates another embodiment of the jaws heat exchanger as well other heat dissipation components within the docking station 100. For perspective, cutaway portions of the base 115 and the docking station 100 are shown. In this embodiment, a single spring 450 separates the two heat transfer elements 400a and 400b. When the heat transfer element 125 is inserted between the engaging surfaces 415a and 415b, the spring 450 expands, allowing the heat transfer elements 400a and 400b to move apart slightly to accommodate the heat transfer element 125. Guides 460a, 460b, 460c, and 460d provide a slideable mounting for the heat transfer elements 400a and 400b, and heat dissipation fins 455a and 455b improve system efficiency.

Figure 5A:
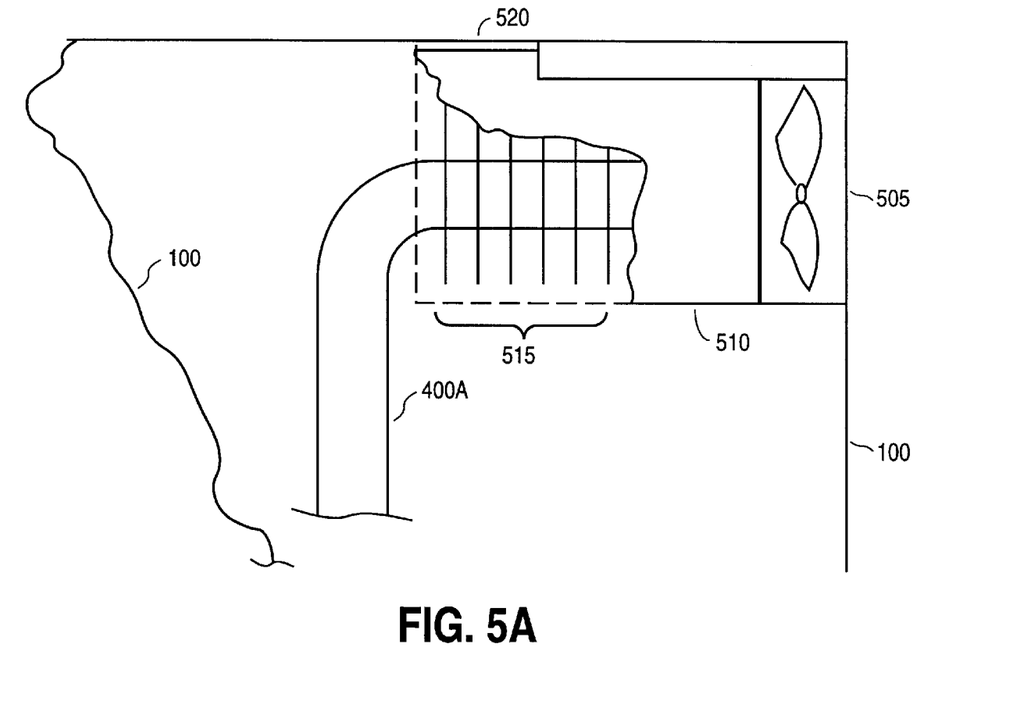
FIG. 5a illustrates a heat dissipation mechanism according to one embodiment of the present invention.
Figure 5B:
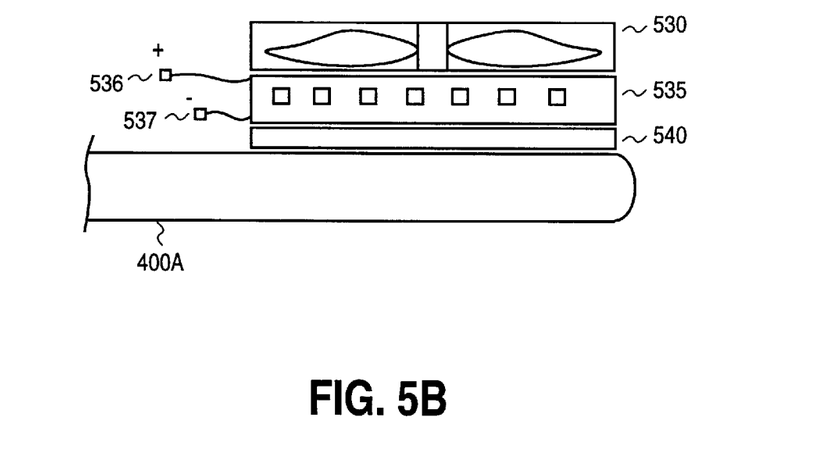
FIG. 5b illustrates a heat dissipation mechanism according to another embodiment of the present invention.

FIG. 5a and FIG. 5b illustrate alternate embodiments of dissipation mechanisms for within the docking station 100. Each is shown only with respect to one heat transfer element 400a. Either solution could be applied to both heat transfer elements 400a and 400b. Additionally, it should be noted that alternate embodiments of the jaws heat exchangers shown in FIGS. 4a through 4e can be implemented with a single heat pipe.

In FIG. 5a, the heat transfer element 400a has a plurality of heat dissipation fins 515. These fins are at least partially encased in an air duct 510 which has at a first end a fan 505. As shown, the fan 505 may be affixed to the housing of the docking station 100. An air inlet 520 at a second end of the duct 510 is typically guarded by a screen (not shown) to keep dust and other particles from accumulating within the docking station. While the inlet is shown on a side of the duct 510, the inlet 520 may also be situated in other locations such as above or below the second end of the duct 510, depending on the configuration of the docking station 100. The docking station 100 may also rely on air vents located throughout its housing rather than supplying a particular inlet for the duct 510. Additionally, longitudinal heat fins (i.e. axially situated along the portion of the heat transfer element 400a in the duct 510 and extending parallel to airflow from the fan 505) may be used to improve airflow through the duct 510.

FIG. 5b illustrates another alternate heat dissipation mechanism for within the docking station 100. This embodiment uses a thermal electric cooling plate (TEC) 535, a cooling device well known in the art. The TEC 535 produces a temperature drop from a top surface to a bottom surface as a voltage is applied via a positive lead 536 and a negative lead 537. The top surface is adjacent to a fan 530. The bottom surface is adjacent to a heat spreader plate 540 which may be a metal or other thermally conductive plate which can be affixed to the heat transfer element 400a.

The TEC 535 transfers heat equivalent to approximately the amount of electrical power supplied to the TEC 535. For example, removing fifteen watts of power from the heat transfer element 400a requires approximately fifteen watts of electrical power. The additional power consumption makes the TEC 535 somewhat unattractive for usage within the portable computing device 105; however, in the docking station 100 which is typically plugged in to a power outlet, the additional power consumption may be acceptable.

Figure 6A:
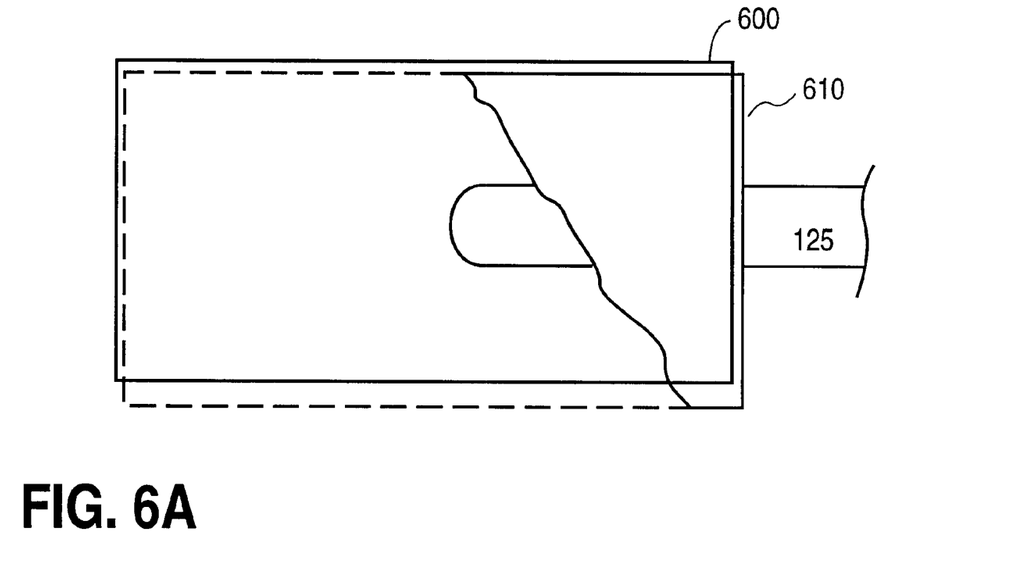
FIG. 6a illustrates an alternate heat exchange mechanism according to one embodiment of the present invention.
Figure 6B:
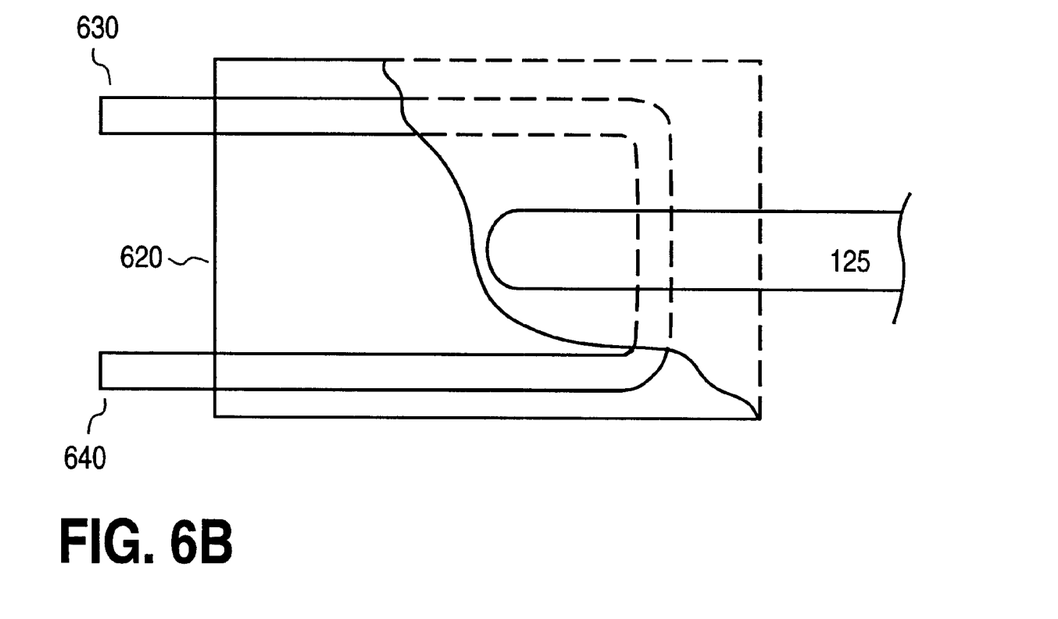
FIG. 6b illustrates another alternate heat exchange mechanism according to another embodiment of the present invention.

FIGS. 6a and 6b illustrate two alternative heat exchange mechanisms for conveying heat from the portable computing device 105 to the docking station 100. In FIG. 6a, two metallic or other heat conductive plates are mounted within the docking station housing. A top plate 600 and a bottom plate 610 are shaped to conformally engage the heat transfer element 125 when the docking station 100 and portable computing device 105 are mated. One or both of the heat conductive plates 600 and 610 and the heat transfer element 125 may be coated with a hardened coating such as molybdenum to reduce wear.

FIG. 6b illustrates the use of a liquid cooled chill block 620 as a heat exchange mechanism. The liquid cooled chill block 620 is mounted in the docking station (either by a spring loaded device or other urging mechanism) to make sufficient contact with the heat transfer element 125 to provide efficient heat transfer. The liquid cooled chill block 620 has an inlet 630 for a cool fluid which cools the block 620 and the heat transfer element 125. From an outlet 640, the warmed fluid is sent to a refrigeration apparatus (not shown) for cooling. Such chill blocks are commercially available and known in the art. Using such a liquid cooled chill block 620 cools a portable computing device becomes practical when the cooling plate can remain in the docking station so that proper refrigeration facilities need not be contained in the portable computing device.

Thus, the method and apparatus of the present invention a number of heat exchanger solutions for a portable computing device and a docking station. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A computing apparatus comprising:
   a base;
   an electronic component disposed within the base; and
   a heat pipe having a first portion thermally coupled to the electronic component and having a second portion positioned in a portion of the base adapted to engage a docking station, the second portion of the heat pipe forming a closed male connector end to removably and thermally engage a female receptacle portion of a second heat pipe.

2. The computing apparatus of claim 1 wherein the base has a base housing including a closeable aperture which exposes the second portion of the heat pipe when the base engages the docking station.

3. A docking apparatus for a computer comprising:
   a housing having a mating end adapted to mate with the computer; and
   a heat pipe partially disposed within said housing having a female receptacle portion at said mating end of said housing for thermal engagement to a closed male connector end of a second heat pipe.

4. The docking apparatus of claim 3 wherein the heat pipe has a plurality of fins disposed upon a portion of the heat pipe.

5. The docking apparatus of claim 4 further comprising a fan disposed in the housing adjacent to the plurality of fins.

6. The docking apparatus of claim 4 further comprising:
   a duct mounted in the housing at least partially surrounding the plurality of fins, the duct having a first opening for the heat transfer element and a second opening; and
   a fan mounted in the housing at the second opening of the duct.

7. The docking apparatus of claim 3 further comprising a liquid cooled chill block having a first portion which engages the heat pipe.

8. The docking apparatus of claim 3 further comprising a metallic sheet mounted within the docking apparatus and thermally coupled to the heat pipe.

9. The docking apparatus of claim 3 further comprising:
   a thermal electric cooling plate thermally coupled to the heat pipe.

10. The docking apparatus of claim 9 wherein the thermal electric cooling plate is thermally coupled to the heat pipe by a heat spreading plate.

11. The docking apparatus of claim 9 wherein a first surface of the thermal electric cooling plate is thermally coupled to the heat pipe and wherein the heat transfer element further comprises a fan affixed to a second surface of the thermal electric cooling plate.

12. An apparatus comprising:
    a housing;
    a heat pipe partially disposed within said housing, said heat pipe forming a closed male connector end to removably thermally engage a female receptacle portion of a second heat pipe.

13. The apparatus of claim 12 wherein the apparatus is a docking station.

14. The apparatus of claim 12 wherein the apparatus is an electronic device having an electronic component therein thermally coupled to the heat pipe.

15. An apparatus comprising:
    a housing;
    a heat pipe partially disposed within said housing, said heat pipe forming a closed female connector end to removably thermally and conformally engage a male receptacle portion of a second heat pipe.

16. The apparatus of claim 15 wherein the apparatus is a docking station.

17. The apparatus of claim 15 wherein the apparatus is an electronic device having an electronic component therein thermally coupled to the heat pipe.

18. An apparatus comprising:
    a housing having a mating edge;
    a first heat pipe disposed substantially within said housing;
    a jaw receptor end disposed at the mating edge of the housing, the jaw receptor end to removably conformally engage a second heat pipe and being thermally coupled to the first heat pipe.

19. The apparatus of claim 18 wherein the apparatus is a docking station, and wherein the first heat pipe is directly in contact with a jaw portion of the jaw receptor end.

20. The apparatus of claim 18 wherein the apparatus is an electronic device having an electronic component therein thermally coupled to the first heat pipe, and wherein the first heat pipe is directly in contact with a jaw portion of the jaw receptor end.

21. The apparatus of claim 18 further comprising a third heat pipe that is directly in contact with a first spring actuated jaw portion of the jaw receptor end, and wherein the first heat pipe is directly in contact with a second spring actuated jaw portion of the jaw receptor end.

* * * * *